United States Patent [19]
Kurachi et al.

[11] Patent Number: 5,865,280
[45] Date of Patent: Feb. 2, 1999

[54] HYDRAULIC LINE COUPLING APPARATUS FOR HYDRAULIC SHOCK ABSORBER

[75] Inventors: Makoto Kurachi; Mineo Yamamoto, both of Iwata, Japan

[73] Assignee: Yamaha Hatsudoki Kabushiki Kaisha, Iwata, Japan

[21] Appl. No.: 725,262

[22] Filed: Oct. 2, 1996

[30] Foreign Application Priority Data

Oct. 2, 1995 [JP] Japan ................................. 7-254974

[51] Int. Cl.$^6$ .................................................. B60T 11/00
[52] U.S. Cl. ............................... 188/352; 60/378; 60/584
[58] Field of Search .............................. 188/352, 322.21; 60/378, 584, 588, 591, 592; 137/614.03, 614.04

[56] References Cited

U.S. PATENT DOCUMENTS

| | | |
|---|---|---|
| 2,372,820 | 4/1945 | Gardes . |
| 3,957,259 | 5/1976 | Peddinghaus ........................ 188/352 X |
| 4,114,866 | 9/1978 | Kato ..................................... 188/352 X |
| 4,159,755 | 7/1979 | Kang et al. ........................... 188/352 X |
| 4,607,670 | 8/1986 | Compton et al. . |
| 4,756,159 | 7/1988 | Compton et al. . |
| 4,979,366 | 12/1990 | Compton et al. . |
| 4,991,627 | 2/1991 | Nix . |
| 5,018,352 | 5/1991 | Compton et al. . |
| 5,083,433 | 1/1992 | Leigh-Monstevens . |
| 5,113,657 | 5/1992 | Compton et al. . |
| 5,188,204 | 2/1993 | Arrowsmith et al. . |

FOREIGN PATENT DOCUMENTS

| | | |
|---|---|---|
| 780 846A | 5/1935 | France . |
| 1032689A | 6/1953 | France . |
| 733 536C | 3/1943 | Germany . |

*Primary Examiner*—Robert J. Oberleitner
*Assistant Examiner*—Pamela J. Lipka
*Attorney, Agent, or Firm*—Knobbe, Martens, Olson & Bear LLP

[57] ABSTRACT

An apparatus for coupling two hydraulic transmission lines to one another is disclosed. The apparatus comprises a first coupling member and a second coupling member. The first coupling member comprises a body having first and second passages. The first passage extends from the connection to the first line to the second passage. A plug is movably positioned in the first passage for selectively opening and closing the first passage between the first line and the second passage. A first and second passage similarly extends through the second coupling member, and a plug is movably positioned in the first passage for selectively opening and closing the first passage between the second line and the second passage. The first and second coupling members are selectively joinable via a sleeve extending between the second passages thereof.

52 Claims, 7 Drawing Sheets

HYDRAULIC LINE COUPLING APPARATUS FOR HYDRAULIC SHOCK ABSORBER

FIELD OF THE INVENTION

The present invention relates to a hydraulic shock system of the type used with a vehicle, the system including coupling apparatus for readily coupling and uncoupling components of the system.

BACKGROUND OF THE INVENTION

Hydraulic shock absorber systems are common on automobiles and other vehicles. These systems generally comprise an oil-filled shock absorber mounted between the suspension of each wheel of the vehicle and the vehicle frame. A hydraulic supply is centrally located between two or more of the shock absorbers. The hydraulic supply is connected to the shock absorbers via tubes or lines which carry hydraulic oil.

During vehicle assembly, the hydraulic system is generally assembled separate from the vehicle on which it is ultimately installed. In this process, the entire hydraulic system is assembled and filled with oil. The system is checked for leaks and the damping is adjusted.

The assembled system is then transported to the vehicle assembly line and installed onto the vehicle. Due to the overall size of the system, transporting and installing the system is difficult and requires a great many workers. As one attempt at solving the installation problems associated with these systems, it is possible to disassemble the system and reassemble it on the vehicle. This also has numerous disadvantages. First, the oil must be drained from the system upon disassembly and be replaced once the system is reassembled on the vehicle. Once the system is installed on the vehicle, however, it is difficult to refill the system with oil as access to the system is often obstructed by other components of the vehicle. In addition, leaks are often created during the disassembly/reassembly process.

Another problem associated with the present systems is that, after installation of the system on the vehicle, later repair is difficult and costly. The same problems which render disassembly of the system for installation on the vehicle undesirable make it difficult to repair individual components of the system later.

A hydraulic shock system which includes coupling apparatus designed for individual component coupling and uncoupling is desirable.

SUMMARY OF THE INVENTION

In accordance with the present invention, a coupling apparatus is provided for coupling hydraulic oil transmission lines. The coupling apparatus allows a user to selectively couple and uncouple the lines. The coupling apparatus allows for uncoupling of the lines while the fluid is retained within the lines.

The coupling apparatus includes a first coupling member attached to a first hydraulic oil transmission line and a second coupling member attached to a second hydraulic oil transmission line. The first coupling member comprises a body having a passage therethrough, a first end of which is in communication with the first line. A second passage extends from the first passage through the body. A valve is provided for selectively closing the first passage between the connection to the first line and the second passage.

The second coupling member comprises a similar body having a first passage therethrough, a first end of which is in communication with said second line. A second passage extends from the first passage through the body. A valve is provided for selectively opening and closing the first passage between the connection of the second line and the second passage. The first and second coupling members are coupled and uncoupled by guiding a sleeve into and out of the second passages of the first and second coupling members.

In accordance with a further aspect of the present invention, coupling apparatus is provided which allows a user to selectively couple and uncouple a hydraulic oil transmission line to a shock absorber without removing the oil in the line or shock absorber.

The shock absorber has a piston rod extending therefrom. The piston rod has a passage therethrough extending from a first end of the rod to an oil filled chamber in the shock absorber. The rod includes valve means for selectively opening and closing the passage.

A coupling member has a first section and a second section, the first section having a chamber therein in which the first end of the rod is positioned. The second section has a passage therethrough, the passage extending from the chamber in the first section to the hydraulic oil transmission line. Valve means are provided for selectively opening and closing the passage in the second section between the chamber in the first section and the line.

Further objects, features, and advantages of the present invention over the prior art will become apparent from the detailed description of the drawings which follows, when considered with the attached figures.

DETAILED DESCRIPTION OF THE PREFERRED EMBODIMENT

Figure 1A:
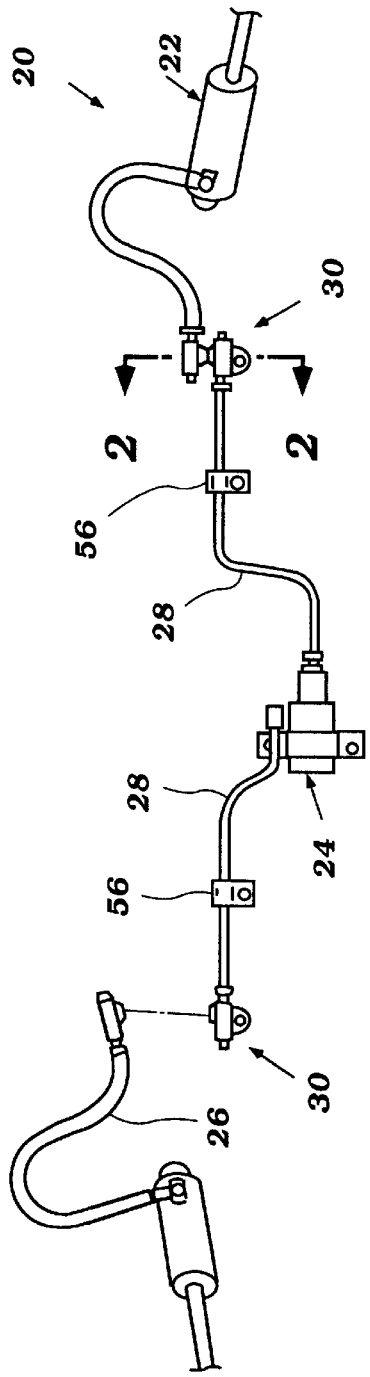
FIG. 1(a) illustrates a vehicle hydraulic shock system which includes a hydraulic shock, a hydraulic pressure regulator, connecting hydraulic oil transmission lines, and hydraulic line coupling apparatus in accordance with the present invention.

FIG. 1(a) illustrates a coupling apparatus 30 in accordance with the present invention utilized in a hydraulic shock absorber system 20. The system 20 described with the coupling apparatus 30 herein is for illustration only, it being understood that the coupling apparatus 30 has utility in numerous other systems varying from that illustrated in FIG. 1 and described herein.

In general, the system 20 of the type utilized on a vehicle includes at least one hydraulic shock absorber 22, a hydraulic oil pressure regulator/supply 24, and a hydraulic oil transmission line extending between each shock absorber and the hydraulic pressure regulator. Normally, these transmission lines comprise a first line 26 extending from the shock 22 and a second line 28 extending from the regulator 24. In accordance with the present invention, a coupling apparatus 30 is provided for sealingly coupling these lines 26,28 and for uncoupling the lines without the need for removing the oil in the system.

Figure 1B:
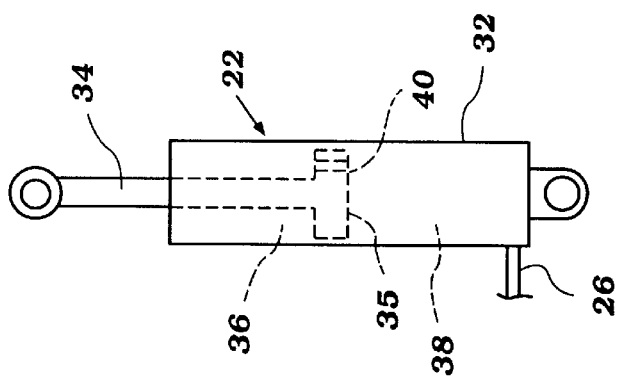
FIG. 1(b) illustrates in schematic form the hydraulic shock absorber of the system illustrated in FIG. 1(a)
Figure 1C:
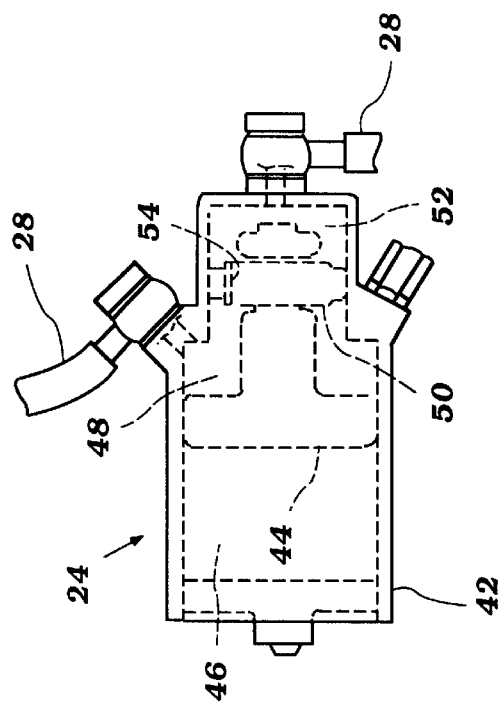
FIG. 1(c) illustrates the hydraulic pressure regulator of the system illustrated in FIG. 1(a)

FIG. 1(*b*) illustrates the hydraulic shock absorber 22 utilized in the system 20. These types of shocks 22 are well known to those skilled in the art. The shock 22 has an outer cylindrical housing 32 having an end for connection to the suspension assembly of a wheel of a vehicle. The shock 22 includes a piston rod 34 having a piston head 35 at one end positioned in the housing 32, and a second end extending beyond the housing for connection to the frame of a vehicle. The piston head 35 divides the interior of the housing 32 into a first oil chamber 36 and a second oil chamber 38. The first and second oil chambers 36,38 communicate through a constricted passage 40 extending through the piston head 35. The first line 26 extends from the shock 22, the line 26 in communication with the second oil chamber 38.

FIG. 1(*c*) illustrates the hydraulic pressure regulator/supply 24 utilized in the system 20. The hydraulic pressure regulator/supply 24 is of the type well known to those skilled in the art. The regulator 24 comprises a housing 42 defining an interior chamber. A first piston 44 is positioned within the housing 42. The first piston 44 divides the interior chamber of the housing 42 into an air chamber 46 and a first oil chamber 48. A second piston 50 is positioned within the first oil chamber 48. The second piston 50 is attached to the first piston 44 so that the first and second pistons 44,50 move together. The second piston 50 defines therebehind a second oil chamber 52. A constricted passage 54 extends through the second piston 50 such that the first and second oil chambers 48,52 are in communication with one another.

One hydraulic line 28 corresponding to one shock 22 is mounted in communication with the first oil chamber 48. A second hydraulic line 28 corresponding to another shock 22 is mounted in communication with the second oil chamber 50.

FIG. 1(*a*) illustrates a common hydraulic shock absorber system 20 arrangement for a vehicle, in which a first shock 22 is mounted at one side of the vehicle between the suspension assembly of a wheel and the frame of the vehicle, and a second shock 22 is mounted at the opposite side of the vehicle between the suspension assembly of an opposite wheel and the frame of the vehicle. In this arrangement, there are thus left and right shock absorbers corresponding to left and right wheels of the vehicle.

The hydraulic regulator 24 is generally mounted between the shock absorbers 22 to the frame of the vehicle. The second lines 28 extend from the hydraulic pressure regulator 24 in opposite directions towards the shocks 22. The first lines 26 extending from each shock 22 engage a respective second line 28 such that a continuous hydraulic oil pathway is formed between the hydraulic pressure regulator 24 and each shock 22.

Most commonly, the transmission lines 28 extending from the hydraulic pressure regulator 24 are constructed of metal tubing. These lines 28 are connected to the frame of the vehicle by one or more brackets 56. The transmission lines 26 connected to the shocks 22 normally comprise flexible high strength hose.

Figure 2:
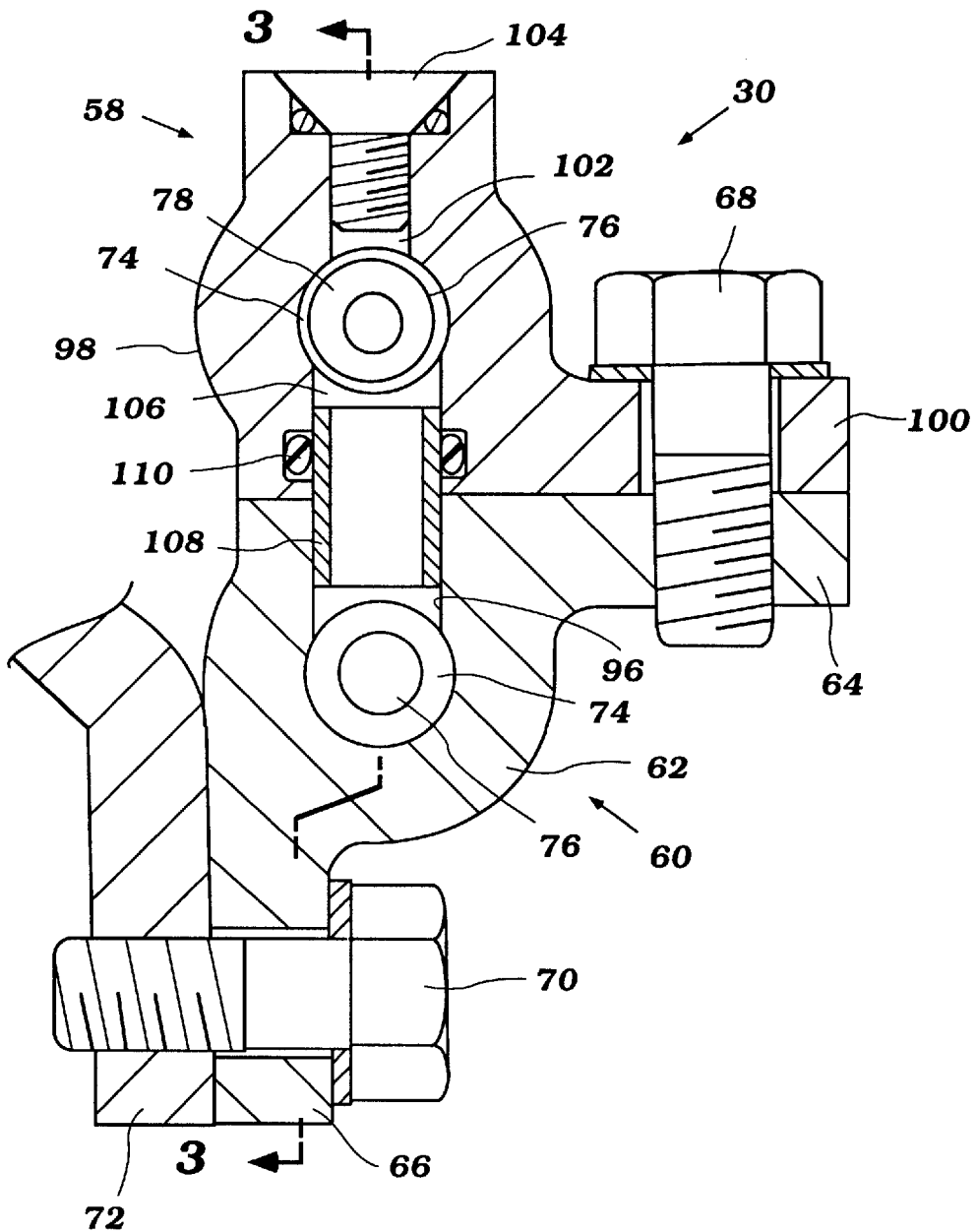
FIG. 2 is a cross-sectional view of the coupling apparatus illustrated in FIG. 1(a) taken along line 2—2 therethrough.
Figure 3:
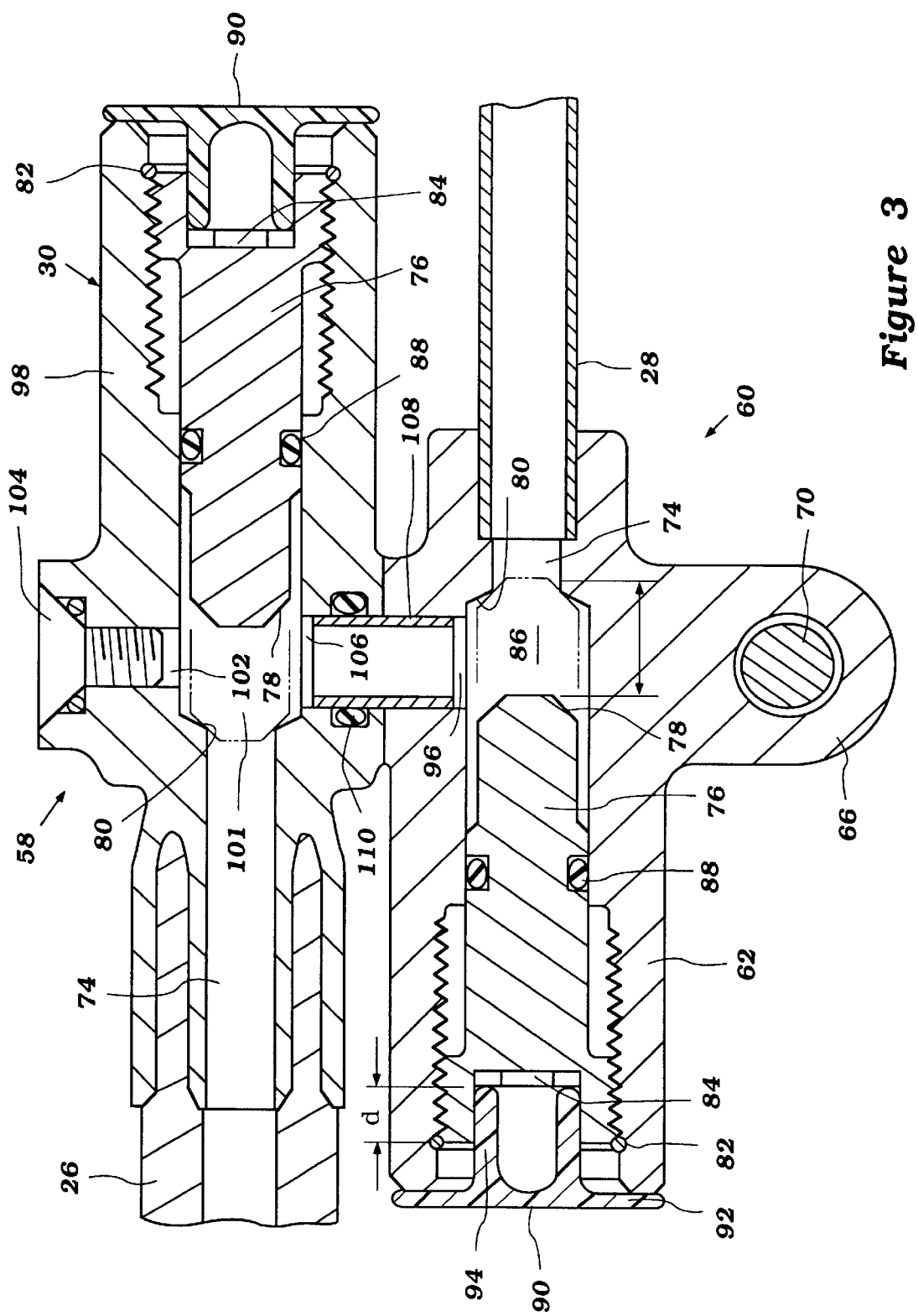
FIG. 3 is a cross-sectional view of the coupling apparatus illustrated in FIG. 2, taken along line 3—3 therethrough.

As stated above, a coupling apparatus 30 is provided in accordance with the present invention for coupling and uncoupling the first and second hydraulic oil transmission lines 26,28. As best illustrated in FIGS. 2 and 3, the coupling apparatus 30 comprises a first coupling member 58 attached to the free end of each first line 26 (i.e. opposite its connection to the shock 22) and a second coupling member 60 attached to the free end of each second line 28 (i.e. the end of the line 28 opposite its connection to the hydraulic regulator 24). The first and second coupling members 58,60 are designed for interengagement so that a continuous oil pathway is formed through the lines 26,28 between the shock 22 and the hydraulic pressure regulator 24.

The second coupling member 60 includes a generally cylindrical body 62 having a first outwardly extending flange 64 and a second outwardly extending flange 66. The first and second flanges 64,66 are generally flat. The first flange 64 is adapted for use in attaching the first and second coupling members 58,60 to one another via a bolt 68. The second flange 66 is adapted for mounting the member 60 to a vehicle frame member 72 via a similar bolt 70.

An elongate passage 74 extends through the body 66 of the second coupling member 60 from one end to the other. As illustrated in FIG. 3, the second line 28 is mounted in communication with the passage 74 at one end of the member 60.

The second coupling member 60 includes valve means for selectively opening and closing the passage 74. Preferably, the valve means comprises a plug 76 positioned within the passage 74 at the end opposite the line 28. The plug 76 includes a threaded portion for engagement with threads on the body 66 within the passage 74. Opposite its threaded end, the plug 76 has a reduced diameter section leading to a tapered end 78. The tapered end 78 is configured for abutment against a shoulder 80 formed by a reduced diameter section of the passage 74. The threaded end of the plug 76 includes a recess 84 for engagement by a tool. The recess 84 may be hexagonal in shape for engagement with an Allen wrench or similar tool.

The plug 76 is adapted for movement inside of the member 60 along the passage 74. A locking ring 82 is positioned within the passage 74 for preventing removal of the plug 76 from the member 60. FIG. 3 illustrates the plug 76 in a retracted or open position. As also illustrated therein in dotted lines, the plug 76 may be screwed forward into a closed position in which its tapered end 78 engages the shoulder 80 and obscures the passage 74.

When the plug 76 is moved to its open position, a chamber 86 exists in the member 60. During use of the system 20, this chamber 86 fills with hydraulic oil. Oil is prevented from leaking from the chamber 86 past the plug 76 with an "O"-ring 88.

An end cap 90 covers the end of the body 66 of the member 60 when the plug 76 is in its open position. The end cap 90 includes an outwardly extending flange 92 for abutment against the end of the body 66 of the member 60. In addition, the cap 90 includes a downwardly extending flange 94 for fitting into the recess 84 of the plug 76. The distance "d" by which the cap 90 engages the plug 76 is less than the maximum travel distance of the plug 76 in the passage 74. In this fashion, when the plug 76 is in its closed position, the cap 90 will not engage the plug 76 and can not be placed over the end of the body 66.

The second member 60 includes a bore 96 extending generally perpendicular to the first passage 74 through the body 66. When the plug 76 is in its open position, this bore 96 is in communication with the chamber 86 and the line 28.

The first coupling member 58 is substantially similar to the second member 60. As illustrated in FIG. 2, the first member 58 includes a generally cylindrical body 98. A flange 100 extends from the body 98. The flange 100 is adapted for engagement with the flange 64 of the second member 58 via the bolt 68 described above.

The first coupling member 58 includes a passage 74 therethrough, a plug 76, an end cap 90, a locking ring 82, a recess 84 in the end of the plug, a tapered plug end 78, a shoulder 80, and an "O"-ring 88. The first hydraulic line 26 engages the end of the coupling member 58 opposite the plug 76 and is in communication with the passage 74.

As illustrated, the first and second coupling members 58,60 are arranged such that the first and second hydraulic lines 26,28 extend therefrom parallel to, but on opposite ends 180 degrees from one another. While this arrangement is preferred, the first and second coupling members 58,60 could be designed to engage one another in other orientations, such as where the lines 26,28 enter the same side or are oriented perpendicular to one another.

When the plug 76 of the first coupling member 58 is in its open position, there is formed in the member 58 a chamber 101. A bleed passage 102 extends from the passage 74 in the first coupling member 58 through the body 98. A screw 104 is positioned in the bleed passage 102 for selectively opening and closing the passage 102.

A bore 106 is provided opposite the bleed passage 102. The bore 106 extends through the body 98 of the first member 58 from the passage 74 and generally perpendicular to the passage. The bore 106 is in communication with the first passage 74 such that a hydraulic oil passage is provided from the bore 106 to the chamber 101, down the first passage 74, and into the first transmission line 26 when the plug 76 is in its open position. The bore 106 is positioned in the body 98 such that it aligns with the bore 96 in the second coupling member 60.

A connecting sleeve 108 extends between the bore 106 in the first coupling member 58 and the bore 96 in the second coupling member 60 when the two members 58,60 are joined. Preferably, one end of the sleeve 108 is press-fit into the bore 96 in the body 66 of the second coupling member 60. The opposite end of the sleeve 108 is designed to slide into the bore 106 in the first coupling member 58. Another "O"-ring 110 is positioned in this bore 106 for preventing leakage between the body 98 and the sleeve 108 when the first and second coupling members 58,60 engage one another.

The coupling apparatus 30 of the present invention allows the first and second transmission lines 26,28 to be coupled and uncoupled from one another. Assembly of a complete hydraulic system utilizing the coupling apparatus 30 of in accordance with the present invention is as follows.

First, all of the components of the system 20 are assembled. The first line 26 extending from each shock 22 is coupled to the second line 28 extending from the hydraulic pressure regulator 24. In this process, the first coupling member 58 is pressed downwardly such that the sleeve 108 extends upwardly into the bore 108 past the "O"-ring 110. The bolt 68 is utilized to maintain the two members 58,69 coupled to one another.

Hydraulic oil is filled into the system 20 and the system bled to remove air therefrom. When oil is filled into the system 20, the plugs 76 are moved to their open positions. With the plugs 76 in their open position, oil passes from the first to the second line 26,28 or vice versa through a continuous passage through the first and second coupling members 58,60. The passage through the first coupling member 58 comprises the passage 74, the chamber 101 and the bore 106. The passage through the second coupling member 60 comprises the passage 74, the chamber 86 and the bore 96. Once filled, the system 20 may then be checked for leaks and the damping adjusted.

Advantageously, the system 20 may then be disassembled for transport and then reassembled without removing the oil from the system. The coupling assembly 30 allows for separation of the shocks absorbers 22 from the hydraulic pressure regulator 24. In order to uncouple the first line 26 from the second line 28, the plug 76 in the second coupling member 60 is screwed inwardly until it closes off the passage 74 when the tapered end 78 abuts the shoulder 80. Next, the plug 76 in the first coupling member 58 is screwed inwardly until it closes of the similar passage therethrough. At that time, the two coupling member 58,60 may be separated without needing to remove the oil from the system 20.

Each component of the system 20 is then transported and installed onto the vehicle. Once the system 20 has been broken into components, a single worker can easily transport and install the system 20. The second transmission lines 28 are attached to the vehicle using the brackets 56 described above, and the second coupling members 60 are attached to the vehicle with the bolts 70. The shocks 22 are installed onto the vehicle.

Once the individual components have been installed, the lines 26,28 are recoupled with the coupling apparatus 30 of the present invention. The first and second coupling members 58,60 are coupled as described above. Next, the plug 76 in the second coupling member 60 is screwed backwardly into its retracted or open position. Hydraulic oil expands into the chamber 86 and up through the bore 96 and sleeve 108. As some air likely remains in this portion of the system, the bleed screw 104 is opened until the air is relieved. This step is accomplished before the plug 76 in the first coupling member 58 is opened. Once all the air is bled off, this plug 76 is moved to its open position.

FIGS. 4–8 illustrate a coupling apparatus 130 in accordance with a second aspect of the present invention. This coupling apparatus 130 is adapted for use in coupling a hydraulic line to a hydraulic shock absorber. This aspect of the present invention may be used with a system 20 including the coupling apparatus 30 disclosed above. Alternatively, the coupling apparatus 130 may be used in a system which does not include the coupling apparatus 30 disclosed above. By way of illustration, the coupling apparatus 130 is described as utilized with a system 20 as described above and illustrated in FIG. 1(*a*).

Figure 4:
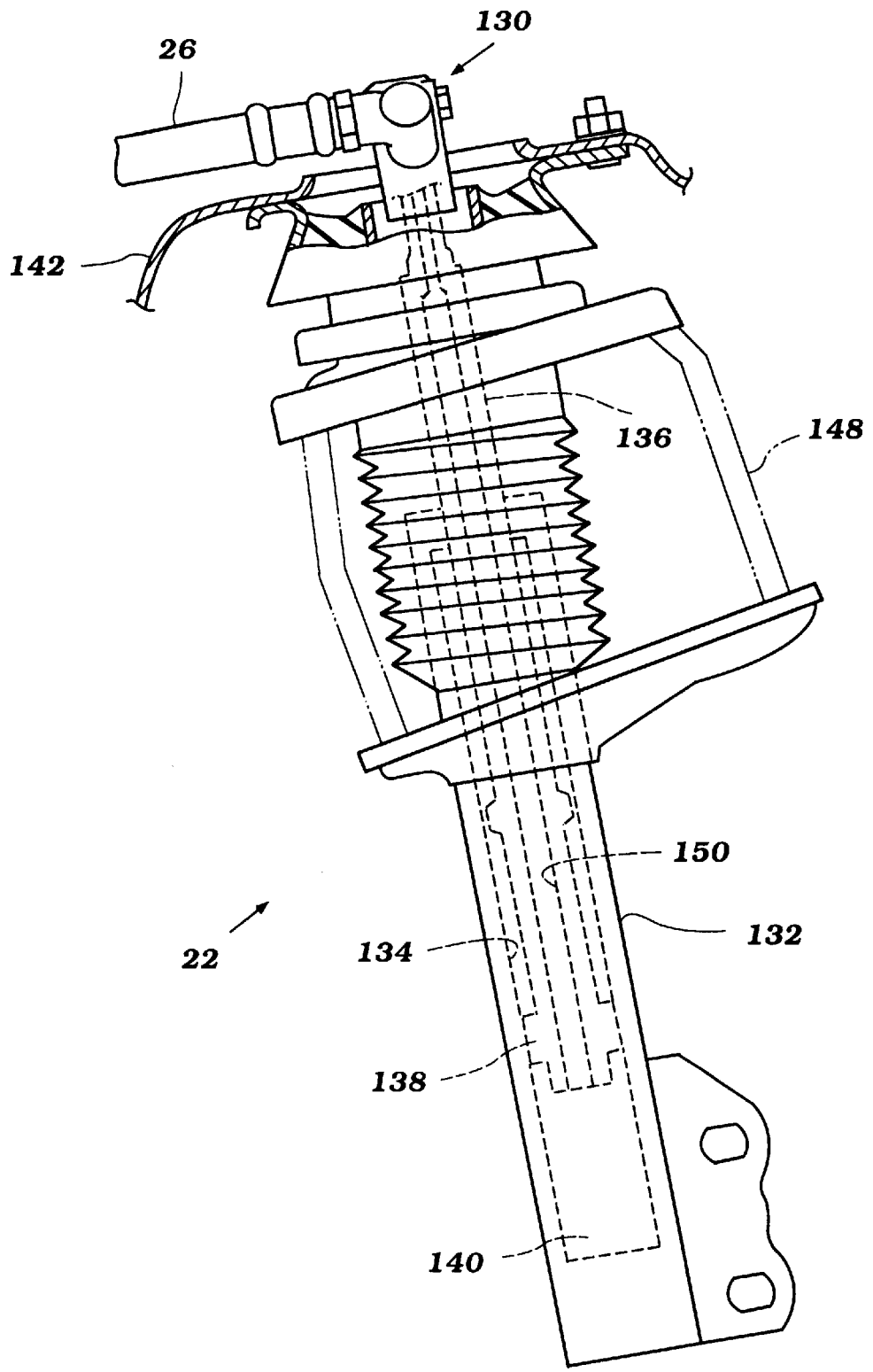
FIG. 4 is a perspective view of a hydraulic shock absorber connected to a hydraulic line with a coupling apparatus in accordance with a second aspect of the present invention.
Figure 5:
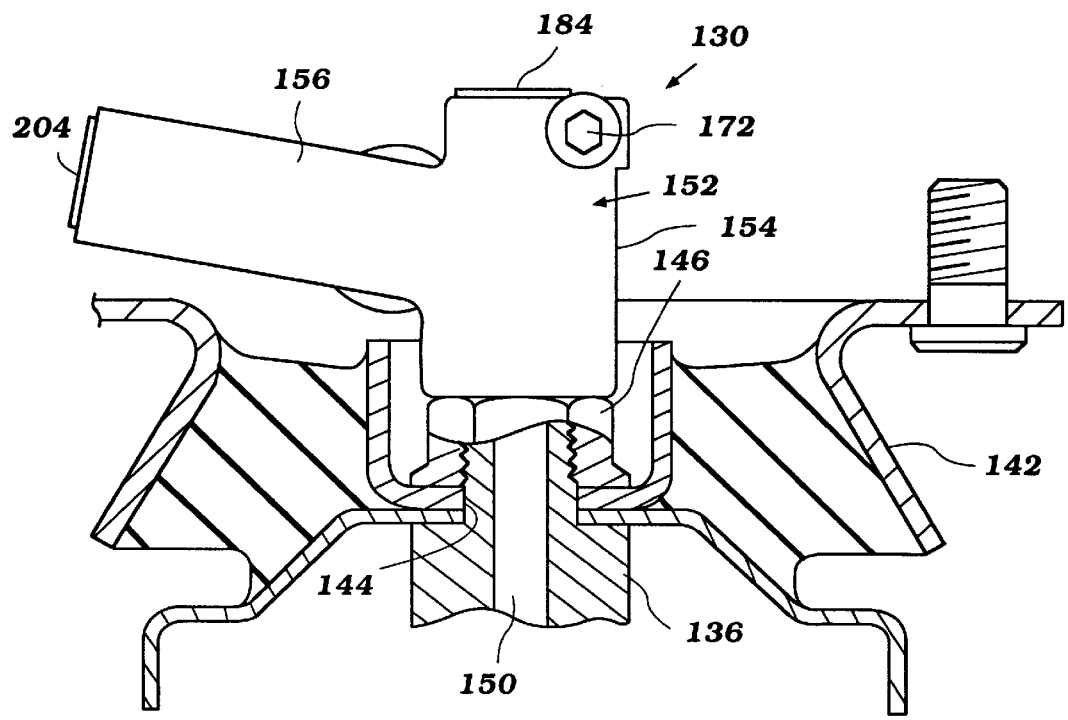
FIG. 5 is a side view, in partial cross-section, illustrating the top portion of the shock absorber and coupling apparatus illustrated in FIG. 4.
Figure 6:
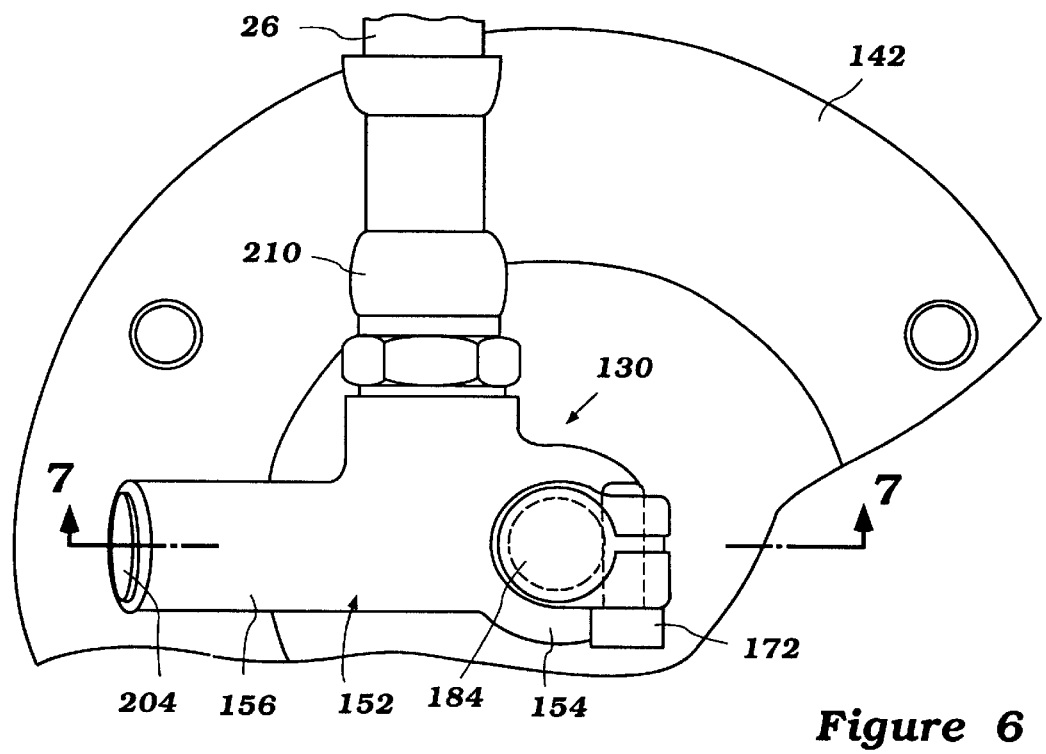
FIG. 6 is a top view of the coupling apparatus and the top portion of the shock absorber illustrated in FIG. 4.

As illustrated in FIG. 4, the shock 22 has an elongate, generally cylindrical outer housing 132 having a hollow interior. The shock absorber 22 includes a rod 136 having a first end extending out of the housing 132 and a second end having a piston head 138 thereon positioned within the interior of the housing. The piston head 138 divides the interior into a first chamber 134 and a second chamber 140.

A first end of the shock 22 is adapted for connection to the suspension assembly of a wheel of a vehicle. A second end of the shock 22 is adapted for connection to a vehicle mounting 142. The first end of the rod 136 extends through a passage 144 in the mounting 142. The rod 136 is maintained in engagement with the mounting 142 via a nut 146. A coil spring 148 extends about the top portion of the shock 22.

A passage 150 extends through the length of the rod 136. The passage 150 communicates, at one end, with the second chamber 140. Two cross-bores 158 extend perpendicular to one another and the length of the rod 136 near the top end of the rod 136. The bores 158 communicate with the passage 150.

Valve means are provided for selectively opening and closing the passage 150 in the rod 136. Preferably, this valve means comprises a plug 160 extending into the passage 150 at the top end of the rod 136. The plug 160 is threaded at one end for engagement of threads in the passage 150 of the rod 136, whereby the plug 160 may be screwed in and out of the rod 136 along the passage 150. A locking ring 162 prevents the plug 160 from being removed from the rod 136. An "O"-ring 164 serves as a seal between the plug 160 and the rod 136 within the passage 150.

The plug 160 has a reduced diameter section in relation to the passage 150 and then a tapered end 166 opposite its threaded end. The tapered end 166 is designed to engage a shoulder 170 formed by a reduced diameter section of the passage 150 within the rod 136.

In accordance with the present invention, a coupling member 152 is provided for coupling the first line 26 in communication with the passage 150 through the rod 136 of the shock 22. As illustrated in FIGS. 5–8, the coupling member 152 has a first generally cylindrical section 154 and a second generally cylindrical section 156 extending therefrom.

Figure 7:
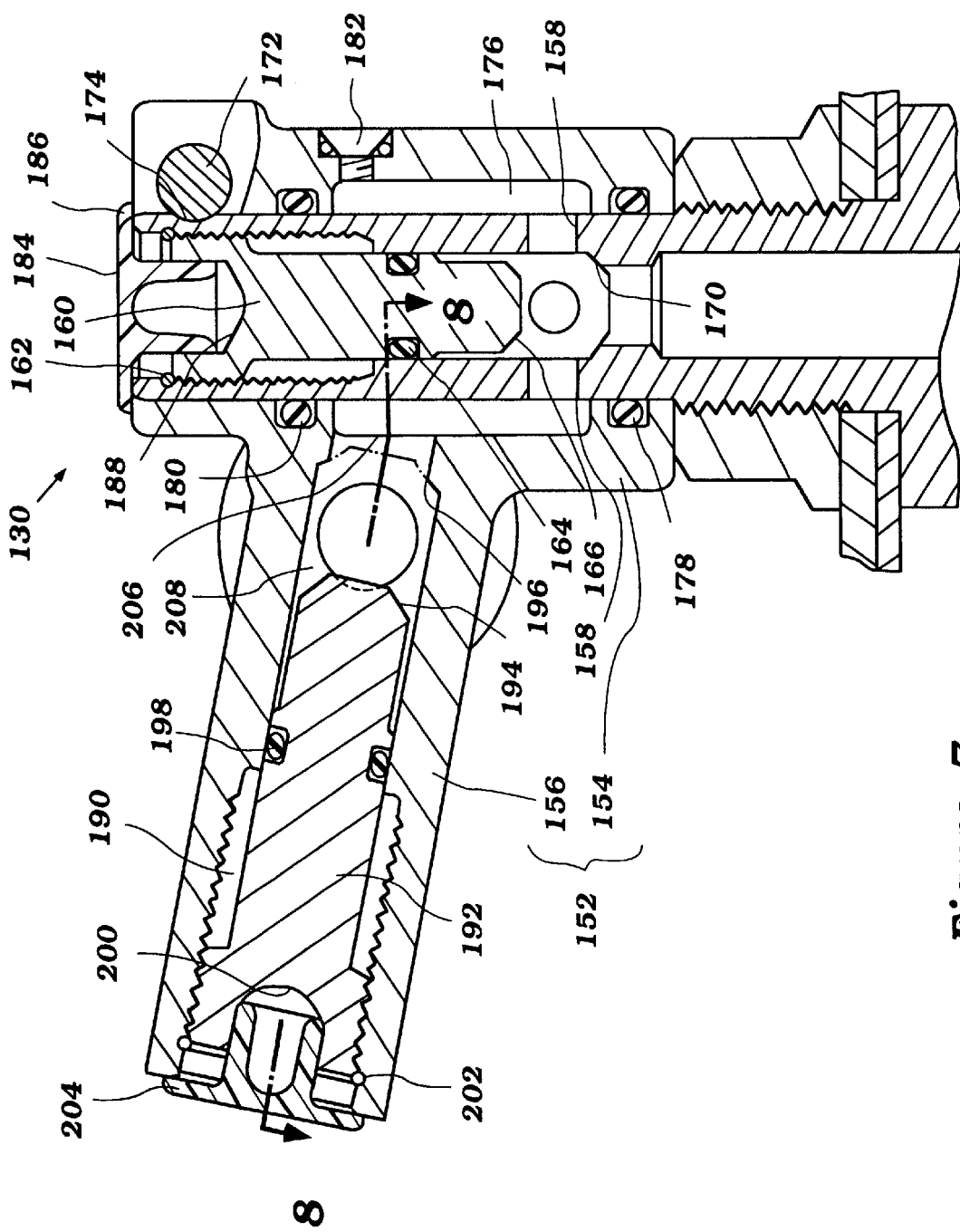
FIG. 7 is a cross-sectional view of that portion of the top portion of the shock and coupling apparatus illustrated in FIG. 6, taken along line 7—7 therethrough.
Figure 8:
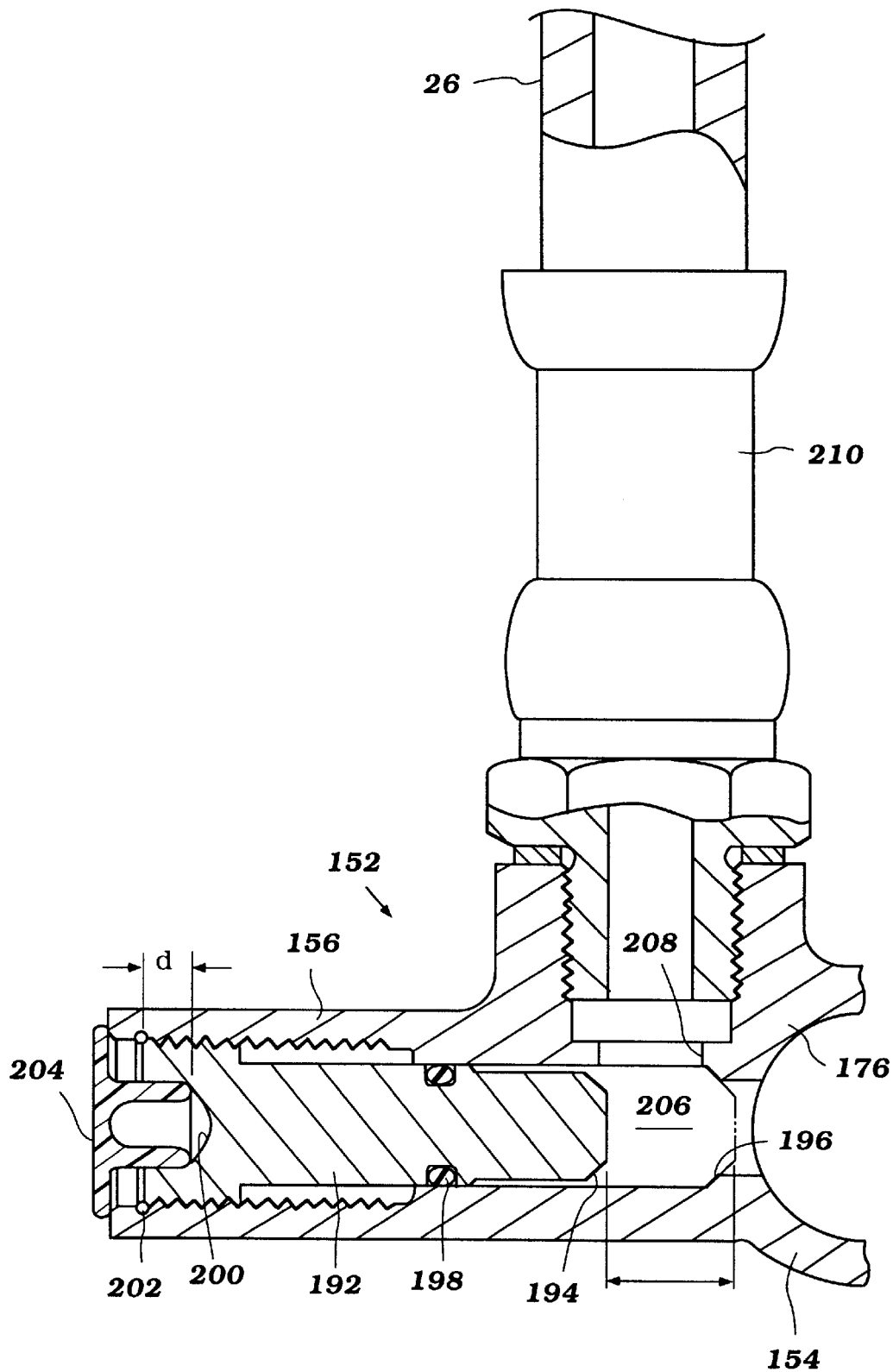
FIG. 8 is a cross-sectional view of the shock and coupling apparatus taken along line 8—8 of FIG. 7.

As best illustrated in FIG. 7, the first section 154 has a hollow interior which accepts the end of the rod 136 in which the plug 160 is positioned. The coupling member 152 is secured onto the rod 136 via a screw 172 which extends transversely through the coupling member 152 and engages a recessed area 174 in the outer surface of the rod 136.

The hollow interior of the first section 154 includes an enlarged section or chamber 176. When the plug 160 is in the position illustrated in FIG. 7, the passage 150 within the rod 136 is in communication with the chamber 176 via the cross-bores 158.

First and second "O"-rings 178,180 are positioned within the coupling member 152 for engagement of the outer surface of the rod 136 for preventing leakage. A bleed screw 182 extends into a bleed passage in communication with the chamber 176.

An end cap 184 is provided for covering the otherwise open end of the first section 154 of the coupling member 152 at the plug 160. The end cap 184 includes an outwardly extending flange 186 and another section for extension into a recess 188 in the end of the plug 160. This recess 188 is preferably hexagonal in shape for engagement with an Allen wrench or similar tool. As with the caps 90 described above, this cap 184 is preferably designed such that it will not engage the plug 160 when the plug is screwed inwardly to its closed position.

The second section 156 of the coupling member 152 extends as a branch off of the first section 154. As illustrated in FIG. 7, the second section 154 has a passage 190 extending therethrough, the passage 190 in alignment with the chamber 176 within the first section 154.

The second section 156 includes valve means for selectively opening and closing the passage 190 therethrough. Preferably, this means comprises a plug 192 positioned in the passage 190 of the second section 156. The plug 192 has a first end which is threaded for engagement with threads within the second section 156. Opposite its threaded end, the plug 192 has a reduced diameter section and a tapered end 194. The tapered end 194 of the plug 192 is designed for engagement with a shoulder 196 extending into the passage 190.

An "O"-ring 198 is positioned on the outside surface of the plug 192 for sealing the plug 192 within the passage 190. The threaded end of the plug 192 includes a recessed area 200. The recessed area 200 is preferably hexagonal in shape for engagement with an Allen wrench. A locking ring 202 is positioned near the end of the passage 190, preventing removal of the plug 192 from the second section 156. A cap 204 similar to the cap 184 described previously is utilized to cover the open end of the second section 156 when the plug 192 is in its open position.

When the plug 192 is in its retracted or open position, a chamber 206 exists in the second section 156. The first transmission line 26 communicates with the chamber 206 through a port 208 in the second section 156. Preferably, a fitting 210 is positioned on the end of the transmission line 26 and engages the port 208.

As illustrated in FIG. 7, when the plugs 160,192 are in their retracted or open positions, a hydraulic oil flow path is formed from the first transmission line 26 to the second chamber 140 within the shock 22. This flow path extends from the line 26, through the port 208 into the chamber 206 in the second section 156 of the coupling member 152, into the chamber 176 of the first section 154 of the coupling member 152, and through the cross-bores 158 and along the passage 150 in the rod 136 to the chamber 140.

Advantageously, the coupling apparatus 130 of the present invention allows the first transmission line 26 to be easily connected and disconnected from the shock 22 without the need to drain the oil from the line or the shock. To separate the line 26 from the shock 22, the plug 160 in the first section 154 of the coupling member 152 is screwed inwardly until its tapered end 166 engages the shoulder 170, closing off the passage 150 through the rod 136. At this time, oil is prevented from leaking from the shock 22. Next, the plug 192 in the second section 156 of the coupling member 152 is screwed inwardly until its tapered end 194 engages the shoulder 196. At this time, oil is prevented from flowing through the line 26 and out of the coupling member 152. The coupling member 152 is separated from the shock 22 by removing the screw 174 and then lifting the coupling member 152 upwardly off of the rod 136 of the shock 22.

Coupling of the line 26 to the shock 22 is generally in the reverse order of disassembly. First, the first section 154 of the coupling member 152 is pushed downwardly over the top end of the rod 136 and affixed thereto utilizing the screw 174. The plug 192 in the second section 156 of the coupling member 152 is then unscrewed. The bleed screw 182 is then opened to bleed any air out of the system. The plug 160 in the first section 154 of the coupling member 152 is then unscrewed. Once the plugs 160,192 are in their unscrewed or open positions as illustrated in FIG. 7, the caps 184,204 may be reinstalled.

It will be understood that the above described arrangements of apparatus and the method therefrom are merely illustrative of applications of the principles of this invention and many other embodiments and modifications may be made without departing from the spirit and scope of the invention as defined in the claims.

What is claimed is:

1. A coupling apparatus for selectively coupling and uncoupling a first hydraulic transmission line and a second hydraulic transmission line, the coupling apparatus comprising a first coupling member comprising a body having a first passage therethrough, said body having a first end adapted for connection to said first line, a second passage extending through said body from said first passage, and valve means movable between a first position in which said first passage is occluded and a second position in which said valve does not obstruct the flow path defined by said first and second passages, said coupling apparatus further comprising a second coupling member comprising a body having a first passage therethrough, said body having a first end adapted for connection to said second line, a second passage extending through said body from said first passage, and valve means moveable between a first position in which said first passage is occluded and a second position in which said valve does not obstruct the flow path defined by said first and second passages.

2. The coupling apparatus in accordance with claim 1, wherein said valve means of said first and second coupling members each comprise a plug.

3. The coupling apparatus in accordance with claim 2, wherein said plug is movably mounted along said first passage.

4. The coupling apparatus in accordance with claim 2, said first passage of said first and second coupling members has a shoulder positioned therein, and wherein said plug has a tapered end, and wherein when said tapered end of said plug engages said shoulder, said first passage is obscured.

5. The coupling apparatus in accordance with claim 2, wherein said plug threadingly engages said first passage.

6. The coupling apparatus in accordance with claim 2, wherein said plug has a first recessed end adapted for engagement with a wrench.

7. The coupling apparatus in accordance with claim 2, further including an "O"-ring positioned between said plug and said body.

8. The coupling apparatus in accordance with claim 1, wherein said second coupling apparatus includes a bleed line extending through said body from said first passage.

9. The coupling apparatus in accordance with claim 8, where in a screw is rotatably positioned in said bleed line.

10. The coupling apparatus in accordance with claim 1, further including a connector extending between said second passage of said first coupling member and said second passage of said second coupling member.

11. The coupling apparatus in accordance with claim 10, wherein said connector comprises a sleeve.

12. The coupling apparatus in accordance with claim 11, wherein said sleeve is press-fit into said second passage of one of said coupling members and slidably engages the second passage of the other of said coupling members.

13. The coupling apparatus in accordance with claim 1, further including an end cap for positioning in a second end of said first and second coupling members.

14. The coupling apparatus in accordance with claim 2, wherein said plug has a section near said tapered end which has an outer diameter which is less than an inner diameter of said first passage.

15. The coupling apparatus of claim 1, wherein a plug is movably positioned in said first passage of said first and second coupling members, said plug movable between a closed and an open position, said plug having a recessed end, and further including an end cap, said end cap engageable with said recessed end of said plug when said plug is in its open position.

16. The coupling apparatus in accordance with claim 1, further including means for securing said first and second coupling members to one another.

17. The coupling apparatus in accordance with claim 16, wherein said means for securing comprises a flange extending from each of said first and second coupling members, and a bolt for extension through said flanges.

18. The coupling apparatus in accordance with claim 1, further including means for securing one or both of said first or second coupling apparatus to a vehicle frame.

19. In combination, a hydraulic shock absorber, a hydraulic oil supply, a first line extending from said shock absorber, a second line extending from said supply, and a coupling apparatus for coupling said first and second lines, said coupling apparatus comprising a first coupling member attached to said first line and a second coupling apparatus attached to said second line, said first coupling member having a first passage extending generally parallel to said first line at the connection thereto, a second passage extending from said first passage generally perpendicular thereto, and valve means for selectively opening and closing said first passage, said second coupling member having a first passage extending generally parallel to said second line at the connection thereto, a second passage extending from said first passage and generally perpendicular thereto, and valve means for selectively opening and closing said first passage, and wherein said second passage of each of said first and second coupling members are adapted for connection to one another.

20. The combination in accordance with claim 19, wherein said valve means of said first and second coupling members each comprise a plug.

21. The combination in accordance with claim 20, wherein said plug is movably mounted along said first passage.

22. The combination in accordance with claim 20, said first passage of said first and second coupling members has a shoulder positioned therein, and wherein said plug has a tapered end, wherein when said tapered end of said plug engages said shoulder, said first passage is obscured.

23. The combination in accordance with claim 20, wherein said plug threadingly engages said first passage.

24. The combination in accordance with claim 20, wherein said plug has a first recessed end adapted for engagement with a wrench.

25. The combination in accordance with claim 20, further including an "O"-ring positioned between said plug and said body.

26. The combination in accordance with claim 19, wherein said second coupling apparatus includes a body defining said first passage and wherein said second coupling apparatus includes a bleed line extending through said body from said first passage to an exterior of said body.

27. The combination in accordance with claim 26, where in a screw is rotatably positioned in said bleed line.

28. The combination in accordance with claim 19, further including a connector extending between said second passage of said first coupling member and said second passage of said second coupling member.

29. The combination in accordance with claim 28, wherein said connector comprises a sleeve.

30. The combination in accordance with claim 29, wherein said sleeve is press-fit into said second passage of one of said coupling members and slidably engages the second passage of the other of said coupling members.

31. The combination in accordance with claim 19, further including an end cap for positioning in a second end of said first and second coupling members.

32. The combination in accordance with claim 19, wherein a plug is movably positioned in said first passage of said first and second coupling members, said plug movable between a closed and an open position, said plug having a recessed end, and further including an end cap, said end cap engageable with said recessed end of said plug when said plug is in its open position.

33. The combination in accordance with claim 19, wherein said first line comprises a hose and said second line comprises a metal tube.

34. The combination in accordance with claim 19, further including means for securing said first and second coupling members to one another.

35. The combination in accordance with claim 34, wherein said means for securing comprises a flange extending from each of said first and second coupling members, and a bolt for extension through said flanges.

36. The combination in accordance with claim 19, further including means for securing one or both of said first or second coupling apparatus to a vehicle frame.

37. The combination in accordance with claim 19, further including a third coupling apparatus for selectively coupling said first line to said shock absorber, said shock absorber having a piston rod having a first end, an elongate passage extending from said first end through said rod to an oil chamber of said shock absorber, and valve means positioned in said first end for selectively opening and closing said elongate passage, and wherein said third coupling apparatus comprises a body having a first section and a second section, said first section having a chamber therein in which said first end of said rod extends, said second section having a first passage therein extending from said chamber in said first section and a second passage extending from said first passage to said first line, and valve means for selectively opening and closing said first passage of said second section between said chamber and said connection to said first line.

38. The combination in accordance with claim 37, wherein said valve means at said first end of said rod and at said second section comprises a plug.

39. The combination in accordance with claim 37, wherein at least one cross-bore extends through said rod generally transverse to said elongate passage.

40. The combination in accordance with claim 37, further including means for securing said third coupling member to said rod.

41. The combination in accordance with claim 40, wherein said means for securing comprises a pin extending through said first section in engagement with a recess in said piston rod.

42. The combination in accordance with claim 37, wherein said elongate passage in said rod includes a shoulder therein and further including a plug movably positioned in said elongate passage, said plug having a tapered end for engagement with said shoulder.

43. The combination in accordance with claim 37, wherein said first section of said third coupling member includes a bleed passage extending from said chamber.

44. The combination in accordance with claim 43, wherein a screw is rotatably positioned in said bleed line.

45. The combination in accordance with claim 37, wherein said valve means of said rod comprises a plug movably positioned in said elongate passage, said plug movable between a first position in which it blocks said passage and a second position in which it cooperates with said rod to form a chamber therein, said chamber in communication with said chamber in said first section of said third coupling member.

46. The combination in accordance with claim 37, wherein said valve means of said second section of said third coupling member comprises a plug, said plug movable between a first position in which it blocks said first passage therethrough and a second position in which it cooperates therewith to form a chamber between said chamber in said first section and said connection to said first line.

47. The combination in accordance with claim 37, further including a coupling for joining said first line to said third coupling member.

48. The combination in accordance with claim 19, wherein said first line extends from said coupling apparatus generally parallel to said second line.

49. The combination in accordance with claim 48, wherein said first line engages said coupling apparatus on an opposite end thereof from said second line.

50. A coupling apparatus for selectively coupling and uncoupling a first hydraulic transmission line and a second hydraulic transmission line, the coupling apparatus comprising a first coupling member comprising a body having a first passage therethrough, said body having a first end adapted for connection to said first line, a second passage extending through said body from said first passage perpendicular thereto, valve means for selectively opening and closing said first passage between said first end and said second passage, a second coupling member comprising a body having a first passage therethrough, said body having a first end adapted for connection to said second line, a second passage extending through said body from said first passage perpendicular thereto, and valve means for selectively opening and closing said first passage between said first end and said second passage, said first and second coupling members arranged to be connected so that said second passages therethrough are joined.

51. The coupling apparatus in accordance with claim 50, further including a connector extending between said second passage of said first coupling member and said second passage of said second coupling member.

52. The coupling apparatus in accordance with claim 51, wherein said first passage of said first coupling member is offset from said first passage of said second coupling member, but extends generally parallel thereto.

* * * * *